Oct. 4, 1955

E. N. BOYLES 2,719,728

TANDEM AXLE SPRING SUSPENSION

Filed Jan. 9, 1953

INVENTOR.
ELMO N. BOYLES
BY
McMorrow, Berman + Davidson
ATTORNEYS

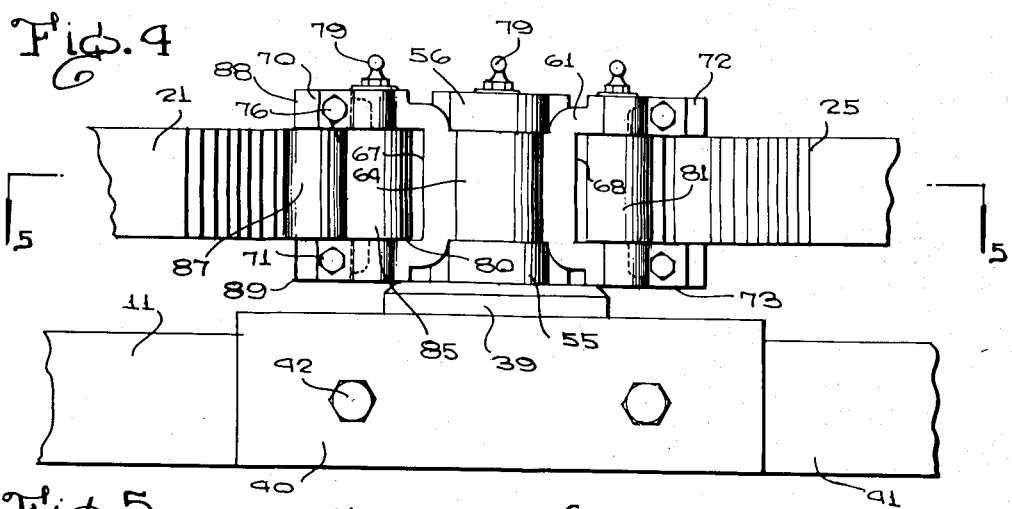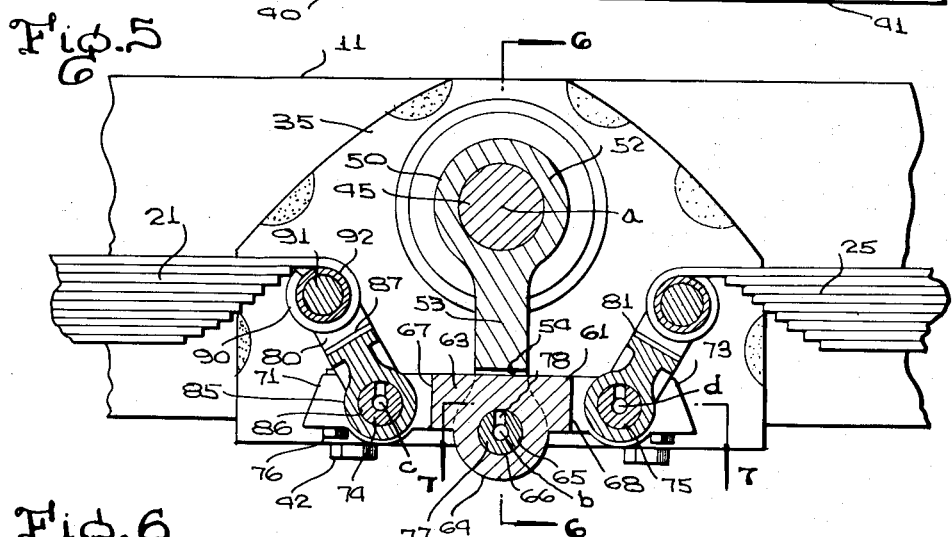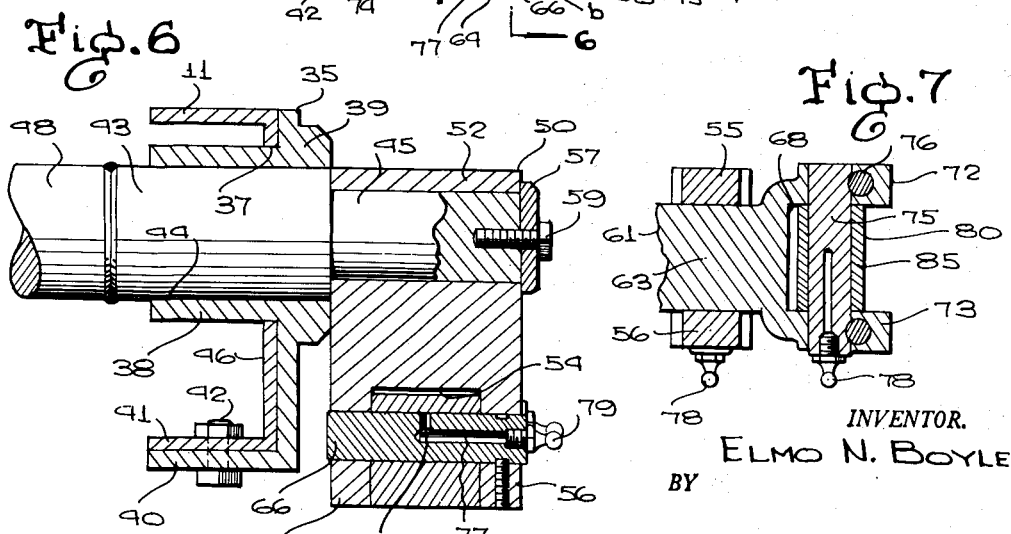

United States Patent Office 2,719,728
Patented Oct. 4, 1955

2,719,728

TANDEM AXLE SPRING SUSPENSION

Elmo N. Boyles, Orlando, Fla.

Application January 9, 1953, Serial No. 330,525

1 Claim. (Cl. 280—104.5)

This invention relates to improvements in tandem axle spring suspensions, especially but not exclusively for vehicles such as trucks.

It is among the objects of the invention to provide an improved leaf spring suspension assembly for supporting the frame of a vehicle, such as a truck, on tandem rear axles and equalizing the load between the axles as the axle carrying wheels encounter rises and depressions in the roadway; which is so constructed that the parts of the spring suspension cannot move to an irreversible position even when subjected to maximum movement of the axles relative to the frame; which permits the addition of a tandem dead axle to a single axle truck without material modification of the truck construction; which can be easily welded or otherwise rigidly secured to an existing truck frame; which is wear resistant and provided with means for thoroughly lubricating all bearings thereof; and which is simple and durable in construction, economical to manufacture and install, and positive and effective in operation.

Other objects and advantages will become apparent from a consideration of the following description and the appended claim in conjunction wtih the accompanying drawings wherein:

Figure 4 is a fragmentary bottom plan view on an enlarged scale of the chassis and spring suspension assembly illustrated in Figure 1;

Figure 5 is a cross sectional view on the line 5—5 of Figure 4;

Figure 6 is a cross sectional view on the line 6—6 of Figure 5; and

Figure 7 is a fragmentary cross sectional view on the line 7—7 of Figure 5.

Figure 1:
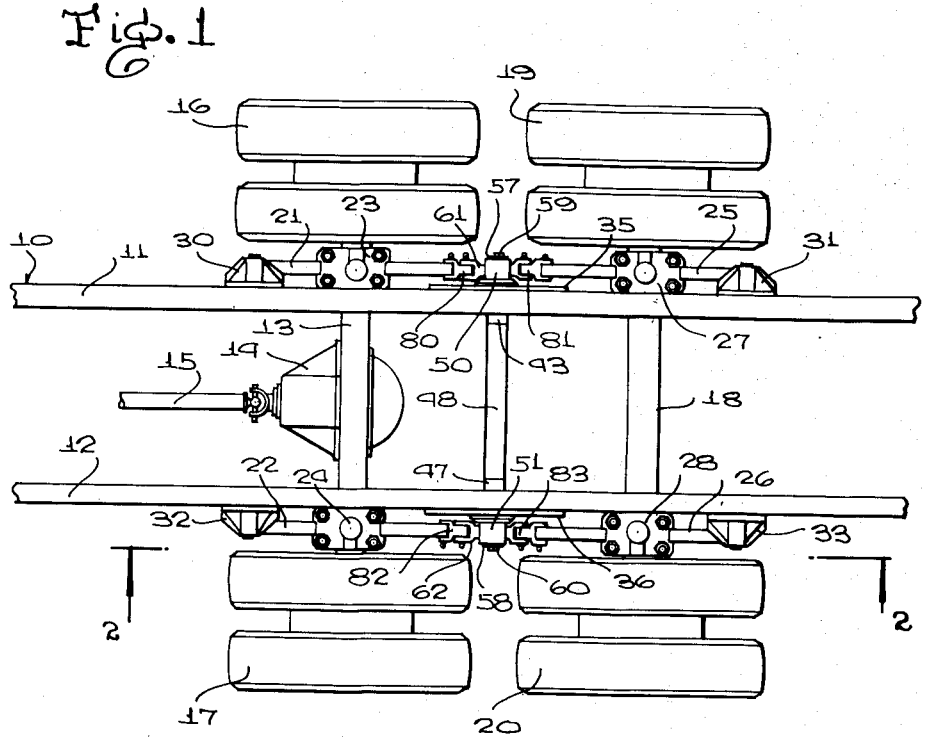
Figure 1 is a top plan view of a fragmentary rear portion of a tandem axle truck chassis including a spring suspension assembly illustrative of the invention.
Figure 2:
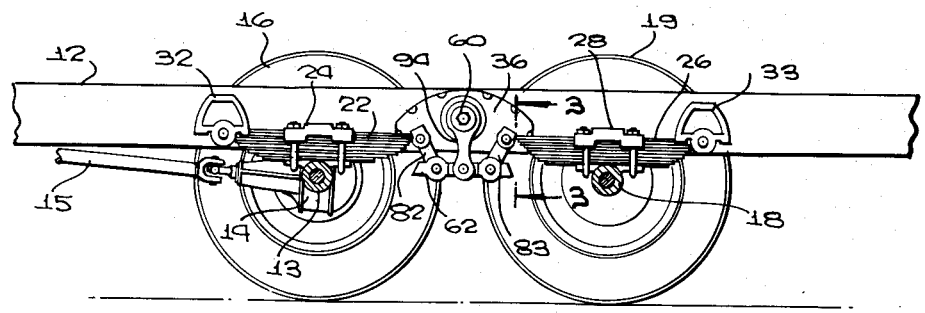
Figure 2 is a cross sectional view on the line 2—2 of Figure 1.
Figure 3:
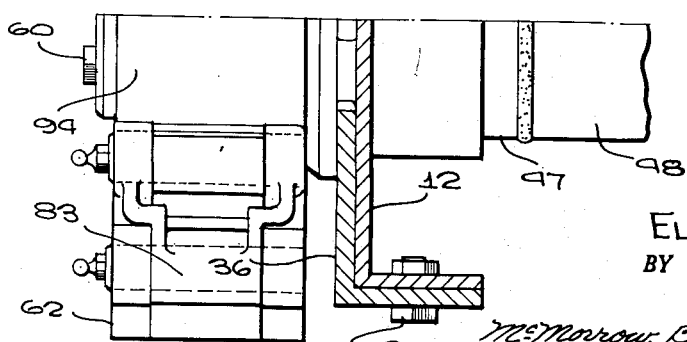
Figure 3 is a fragmentary cross sectional view on an enlarged scale on the line 3—3 of Figure 2.

With continued reference to the drawings, the truck chassis fragmentarily illustrated, comprises a frame, generally indicated at 10, including spaced apart and substantially parallel side rails 11 and 12 and the usual cross members, a forward driven axle assembly 13 extending transversely of the frame below the same and including the usual differential housing 14 to which the drive shaft 15 is connected, rear drive wheels 16 and 17 mounted on the axle assembly 13 at locations spaced from the outer sides of the side rails 11 and 12 respectively, a rear tandem dead axle 18 extending transversely of the frame below the frame rearwardly of and substantially parallel to the driven axle 13, and wheels 19 and 20 journaled on the axle 18 at locations spaced from the outer sides of the side rails 11 and 12.

While the rear tandem axle 18 has been shown as a dead axle, that is, having no wheel driving equipment, it is to be understood that this rear tandem axle 18 may also be a live axle, if desired, without in any way exceeding the scope of the invention.

Leaf springs 21 and 22 are medially mounted on the front or forward tandem axle 13 preferably at the inward sides of the corresponding side rails 11 and 12 of the frame and extend transversely of the axle and longitudinally of the frame side rails, being secured to the axle by spring clamps 23 and 24 of known construction. These springs 21 and 22 constitute the forward springs of the tandem assembly and each has a front end and a rear end.

Similar leaf springs 25 and 26 are mounted on the rearward tandem axle 18 medially of the length of the springs, preferably at the inward sides of the side rails 11 and 12 of the chassis frame. These springs are secured to the axle 18 by spring clamps 27 and 28 of known construction, and constitute rear springs of the tandem arrangement, each having a front end and a rear end.

Spring hanger brackets 30 and 31 are mounted preferably on the side rail 11 at the outer side of this side rail and at spaced apart locations therealong and the bracket 30 is pivotally connected directly to the spring 21 at the front end of this spring, while the bracket 31 is pivotally connected directdly to the spring 25 at the rear end thereof. Similar spring hanger brackets 32 and 33 are mounted on the side rail 12 at the outer side of this side rail and at spaced apart locations therealong, and the bracket 32 is pivotally connected directly to the forward spring 22 at the front end of the latter, while the bracket 23 is pivotally connected directly to the rearward spring 26 at the rear end thereof.

A bracket plate 35 is mounted on the side rail 11 at the outer side of this side rail and substantially midway between the brackets 30 and 31 and a similar bracket plate 36 is mounted on the side rail 12 at the outer side of this side rail and substantially midway between the brackets 32 and 33.

Referring to Figure 6 for details of the construction of the bracket plates, as illustrated in this figure, the web of the frame side rail 11 is provided at a location substantially midway between the brackets 32 and 33 with a circular aperture 37 and the bracket plate 36 has a tubular, cylindrical boss 38 which extends through the aperture 37. The bracket plate is also provided with a flange 40 which underlies the bottom flange 41 of the side rail 11 and is secured to this side rail by suitable means, such as the bolts 42 extending through registering apertures in the bracket plate flange 40 and the side rail bottom flange 41.

A cylindrical trunnion 43 is journaled in the bore 44 of the boss 38 of the bracket plate 35 and has a coaxial terminal portion 45 of reduced diameter projecting outwardly from the end of the portion 39 of the boss 38 and disposed substantially perpendicular to the outer face of the web 46 of the side rail 12.

The web of the side rail 12 is provided with an aperture corresponding to the aperture 37 in the web of the side rail 11, and the bracket plate 36 is of the same construction as the bracket plate 35 and is secured to the side rail 12 in the same manner that the bracket plate 35 is secured to the side rail 11, as explained above. A trunnion 47 is journaled in the bore of the boss 38 of the bracket plate 36. The trunnion 47 has a coaxial terminal 45 of reduced diameter. A connecting and reinforcing bar 48 extends between the inner or adjacent ends of the trunnions 43 and 47 and is welded at its ends to the corresponding trunnions to strengthen the mounting of the bracket plates 35 and 36 on the side rails of the chassis frame.

A depending hanger arm 50 is journaled at its upper end on the terminal of reduced diameter of the trunnion 43, and a similar depending hanger arm 51 is journaled at its upper end on the reduced terminal portion of the trunnion 47.

The hanger arms 50 and 51 are of identical construction and the hanger arm 50 is illustrated in detail in Figures 5 and 6 wherein it is shown as having at its upper end a cylindrical sleeve or eye formation 52 which receives the reduced terminal 45 of the trunnion 43, an intermediate or stem portion 53 of rectangular cross sectional shape and a bifurcated lower end portion having a notch 54 of rectangular shape extending inwardly from the lower end thereof symmetrically of the width of the hanger arm with cylindrical eye formations 55 and 56 disposed one at each side of the notch 54.

With this arrangement, the hanger arms can swing freely about the corresponding trunnion terminals 45 and are held on the terminals by suitable means, such as the washer plates 57 and 58 disposed against the outer ends of the terminals 45 in overlapping relationship to the portions of the outer edges of the hanger arms 50 and 51 surrounding the terminals and these washer plates are secured to the terminals by suitable means, such as the studs 59 and 60 extending through centrally located apertures in the corresponding washer plates and threaded into tapped holes provided in the terminals and opening to the outer ends thereof.

A cross arm 61 is pivotally connected at its mid-length location to the lower end of the hanger arm 50 and a corresponding cross arm 62 is pivotally connected at its mid-length location to the lower end of the hanger arm 51. The cross arms 61 and 62 are substantially identical in construction and the construction of the cross arm 61 and its connection to the associated hanger arm 53 is illustrated in detail in Figures 5, 6 and 7.

The cross arm 61 has an intermediate portion 63 of rectangular cross sectional shape received in the notch 54 of the corresponding hanger arm 53 and provided at the mid-length location of the cross arm with a transversely extending formation 64 of substantially semi-cylindrical shape. A bore 65 extends transversely through the cross arm coaxially of the extension 64 and a pin 66 extends through this bore and through the sleeve or eye formations 55 and 56 at the bottom end of the hanger arm 50 to pivotally connect the cross arm to the hanger arm for rocking movements of the former relative to the latter. It will be noted that the intermediate portion of the cross arm substantially fills the notch 54 in the hanger arm, a predetermined clearance only being left between the inner end of the notch 54 in the hanger arm and the adjacent surface of the cross arm, so that rocking movements of the cross arm relative to the hanger arm about the pin 66 are limited to a predetermined extent.

At its opposite ends the cross arm 61 is bifurcated, being provided with notches 67 and 68 of rectangular shape and with end portions 70 and 71 of rectangular shape disposed at respectively opposite sides of the notch 67 and similar end portions 72 and 73 disposed at respectively opposite sides of the notch 68. The paired end portions 70 and 71 extend laterally beyond the corresponding sides of the intermediate portion 63 of the cross arm and are provided with mutually registering apertures through which a pivot pin 74 extends and the end portions 72 and 73 also extend laterally outwardly of the corresponding edges of the intermediate portion of the cross arm and are provided with mutually registering apertures receiving a pivot pin 75.

Bolts, as indicated at 76, extend one through each end portion of the cross arm and are engaged in corresponding notches provided in the cylindrical surfaces of the pivot pins 74 and 75 to secure the pivot pins in place in the cross arms in the manner illustrated in Figure 7.

Each of the pivot pins 66, 74 and 75 and each of the corresponding pivot pins extending transversely through the cross arm 62 is provided with an axial blind bore, as indicated at 77 for the pin 66, and with a radial passage 78 extending from this bore to the cylindrical surface of the pin adjacent the mid-length location of the pin. The bore 77 and passage 78 provide a lubricant channel and grease fittings, as indicated at 79, and are secured one in the open end of each of the blind bores 77 at the outer end of the corresponding pivot pin, so that lubricant under pressure can be applied through the passages in these pins to the bearing surfaces between the pins and the corresponding hanger arms and spring shackles.

Spring shackles 80 and 81 are disposed one at each end of the cross arm 61 and pivotally connected to the cross arm by the pivot pins 74 and 75 respectively, and the shackle 80 pivotally connects the rear end of the forward spring 21 to the cross arm 61, while the shackle 81 pivotally connects the front end of the rearward spring 25 to this cross arm. Similar shackles 82 and 83 are disposed one at each end of the cross arm 62 and pivotally connected to the cross arm by pivot pins corresponding to the pivot pins 74 and 75, and the shackle 82 pivotally connects the rear end of the forward spring 22 to the cross arm 62, while the shackle 83 pivotally connects the front end of the rearward spring 26 to the cross arm 62.

The shackles 80, 81, 82 and 83 may all be of identical construction, and the shackle 80 is illustrated in detail in Figures 4 and 5. The shackle 80 has, at one end, a generally cylindrical sleeve formation 85 provided with a longitudinally extending, coaxial bore 86 which receives the portion of the pivot pin 74 between the corresponding end portions 70 and 71 of the cross arm 61, this end portion of the shackle being disposed in the notch 67 between the corresponding end portions of the cross arm. At its other end the shackle 80 is bifurcated, being provided with a notch 87 of rectangular shape disposed medially of the width of the shackle and with end portions 88 and 89 disposed one at each side of the notch 87 and extending laterally outwardly of the end portion 85 of the shackle received in the notch 67 in the corresponding end of the cross arm 61. The sleeve or eye 90 on the rear end of the spring 21 is disposed in the notch 87 and between the end portions 88 and 89 of the shackle 80, and the end portions 88 and 89 of the shackle are provided with mutually registering apertures receiving the ends of a pivot or shackle pin 91 which also extends through the eye 90 of the spring 21. A bearing bushing 92 is disposed in the spring eye 90 surrounding the portion of the pin 91 between the end portions 88 and 89 of the shackle 80.

As all of the spring shackles may be of the same construction as the shackle 80 and connected to the corresponding cross arm and spring in the same manner, a more detailed description of the shackles is considered unnecessary for the purposes of the present disclosure.

The laterally projecting end portions 88 and 89 of the shackle 80 are engageable at their inner ends with the corresponding square end portions 70 and 71 of the cross arm 61 when the shackle has been turned to a predetermined position about the pivot pin 74 in a direction away from the trunnion 45, so that the shackle cannot swing around the pin 74 to a position such that the pin 91 is brought into longitudinal alignment with the cross arm 61 or below the adjacent end of this cross arm. This prevents the shackles from moving to an irreversible or locked position relative to the corresponding cross arms and springs and maintains the spring hanger assembly against becoming locked when subjected to the maximum movement of the axles relative to the chassis frame.

The distance $a$—$b$ from the center or axis $a$ of either of the trunnions 43 and 47 to the center or axis $b$ of the pivot pin in the lower arm of the associated hanger arm bears a proportion to the distance $c$—$d$ between the centers or axes of the pivot pins connecting the shackles to the corresponding cross arm of between 1.1 and 1.15, so that, when the hanger assembly is operatively assembled with the chassis frame and axle mounted springs, the hanger arms cannot swing about the corresponding trunnions in excess of a predetermined angular extent which is less than the angular extent necessary to permit the adjacent ends of the corresponding springs to strike the hanger bar. This also keeps the hanger arms from reversing their positions relative to the corresponding trunnions so that the hanger arms always depend from the trunnions and never extend upwardly therefrom.

In the operation of the device, assuming that one of the live axle wheels, for example, the wheel 17, encounters a sharp rise in the roadway, forcing the corresponding end of the axle 13 upwardly toward the bottom of the frame side rail 12. This will tend to raise the rear end of spring 22 and the resultant force on the shackle 82 will tilt the cross arm 62 relative to the associated hanger arm 94, so that the end of the cross arm connected to the spring 22 is above the end of the cross arm connected to the front end of the spring 26. As the cross arm 62 is tilted, however, the associated hanger arm 51 is swung forwardly about the trunnion 47, raising the location of the pivotal connection between the bottom end of the hanger arm and the associated cross arm. This raises the location of the pivotal connection between the rear end of the cross arm 62 and the spring hanger 83 and minimizes or substantially neutralizes the upwardly directed force exerted on the forward end of the spring 26, so that the rearward tandem axle 18 is not moved materially relative to the frame side rail 12, but continues to support the load of the frame substantially in its original position relative to the frame. This action permits a wheel to rise easily as it passes over an obstruction or sharp rise in the roadway and also, by reducing the amount of movement of one axle when a wheel on the other axle drops into a depression in the roadway, permits a wheel to drop into such a depression and move out of the depression without any material change of the loading on the axles or springs.

From the above description it will be apparent that, while the hanger and spring assembly may be easily applied to new trucks having tandem rear axles, it is also well adapted for the addition of a tandem axle to a truck originally provided with only a single rear axle to increase the load capacity of such a truck.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claim are, therefore, intended to be embraced therein.

What is claimed is:

In combination with a vehicle frame including spaced apart side rails, axles disposed transversely of the frame in spaced apart and substantially parallel relationship to each other, and leaf springs mounted medially of their length on and extending transversely of said axles one near each end of each axle and longitudinally of said side rails and comprising forward springs and rearward springs each having a front and a rear end, fixed brackets mounted on said side rails and pivotally connected directly one to each forward spring at the front end thereof and one to each rearward spring at the rear end thereof, mounting plates secured one on each side rail between the rear end of the corresponding forward spring and the front end of the corresponding rearward spring, trunnions secured one to each mounting plate and having axial terminals extending outwardly therefrom at levels above the adjacent spring ends, hanger arms journaled one on each of said trunnion terminals and depending therefrom, cross arms pivotally connected one to each hanger arm below the corresponding trunnion terminal and substantially at the mid-length location of the cross arm, and shackles pivotally connected to each cross arm at respectively opposite ends of the corresponding hanger arm and at locations substantially equally distant from the latter, said shackles extending upwardly from the cross arms and being pivotally connected at locations spaced from said cross arms one to each forward spring at the rear end thereof and one to each rearward spring at the front end thereof the pivotal connections of the spring shackles to the springs being at levels below the axes of the trunnion terminals, first means on said hanger arms limiting tilting of the cross arms relative to the hanger arms, and second means on the cross arms limiting tilting of the spring hangers relative to the cross arms.

References Cited in the file of this patent

UNITED STATES PATENTS

| 1,422,567 | Guillery | July 11, 1922 |
| 1,745,433 | Marcum | Feb. 4, 1930 |
| 2,237,972 | Prazen | Apr. 8, 1941 |
| 2,639,166 | Jones | May 19, 1953 |